United States Patent
Kaku et al.

[11] Patent Number: 5,189,684
[45] Date of Patent: Feb. 23, 1993

[54] LINE SIGNAL DETERIORATION REMOVING SYSTEMS

[75] Inventors: Takashi Kaku, Tama; Hiroki Kishimoto; Kyoko Hirao, both of Kawasaki, all of Japan

[73] Assignee: Fujitsu Limited, Kawasaki, Japan

[21] Appl. No.: 582,207

[22] PCT Filed: Jun. 6, 1990

[86] PCT No.: PCT/JP90/00735
§ 371 Date: Oct. 2, 1990
§ 102(e) Date: Oct. 2, 1990

[87] PCT Pub. No.: WO90/16117
PCT Pub. Date: Dec. 27, 1990

[30] Foreign Application Priority Data
Jun. 13, 1989 [JP] Japan .................. 1-151273
Jun. 13, 1989 [JP] Japan .................. 1-151274

[51] Int. Cl.$^5$ .............................. H03H 7/30
[52] U.S. Cl. .................... 375/14; 375/101; 328/155
[58] Field of Search .............. 375/11, 12, 14, 99, 375/101–103; 333/18; 264/724.2; 328/155

[56] References Cited

U.S. PATENT DOCUMENTS

| | | | |
|---|---|---|---|
| 3,727,134 | 4/1973 | Melvin | 328/155 |
| 3,887,874 | 6/1975 | Reed et al. | 328/167 |
| 3,962,637 | 6/1976 | Motley et al. | 375/1 X |
| 4,097,807 | 6/1978 | Fujimura | 333/18 |
| 4,567,599 | 1/1986 | Mizoguchi | 333/18 |
| 4,669,096 | 1/1987 | Sari et al. | 375/1 X |
| 4,718,073 | 1/1988 | Takaoka | 375/1 X |
| 4,953,183 | 8/1990 | Bergmans et al. | 375/101 |

FOREIGN PATENT DOCUMENTS 59-105741 6/1984 Japan .

OTHER PUBLICATIONS

IBM Technical Disclosure Bulletin, vol. 18, No. 8, Jan. 1976, pp. 2548–2552; Desblache & Godard: "Phase Jitter Attenuation using a Kalman Predictor".

Primary Examiner—Stephen Chin
Attorney, Agent, or Firm—Staas & Halsey

[57] ABSTRACT

A system for removing line deterioration elements such as intersymbol interference, carrier frequency offset and phase jitter, etc. from the receiving signal. An automatic equalizing unit compensates for signal deterioration by intersymbol interference. Next, a carrier phase control unit compensates for signal deterioration by carrier frequency offset. Thereafter, a phase jitter interference removing units allows increase of only phase jitter element by utilizing line characteristic to easily extract phase jitter element. Since the signal including phase jitter is a low frequency signal, a phase jitter removing unit further removes phase jitter by shifting the frequency range to a higher frequency range on the frequency axis and then shifting it to the bandwidth for each processing.

11 Claims, 7 Drawing Sheets

FIG. 3

| ITEM | LINE DETERIORATION FACTOR | DETERIORATION FACTOR CANCELLING FUNCTION | ENCODING | PHASE | INTER-FERENCE | JITTER |
|---|---|---|---|---|---|---|
| 1 | INTERSYMBOL INTERFERENCE | AUTOMATIC EQUALIZER | — | — | — | — |
| 2 | PHASE ERROR, FREQUENCY OFFSET | CARRIER APC | O | — | — | — |
| 3 | PHASE JITTER INTERFERENCE | PHASE JITTER INTERFERENCE CANCEL | O | O | — | — |
| 4 | PHASE JITTER | PHASE JITTER REMOVING CIRCUIT | O | O | O | — |

THE MARK "—" IN THE TABLE MEANS THAT EXISTENCE OF DETERIORATION FACTORS CORRESPONDING TO THE RELEVANT ITEMS WILL NOT RESULT IN ANY PROBLEM ON EFFECTUATION OF CANCELING FUNCTION. THE MARK "O" MEANS THAT THE RELEVANT ITEMS SHOULD PREFERABLY BE CANCELLED PREVIOUSLY FOR EFFECTUATION OF CANCELING FUNCTION.

FIG. 4

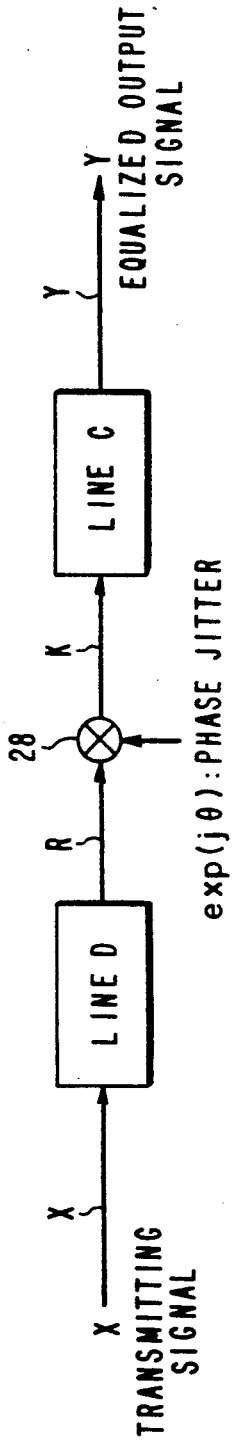

$\exp(j\theta)$: PHASE JITTER

LINE SIGNAL DETERIORATION REMOVING SYSTEMS

BACKGROUND OF THE INVENTION

1. Field of the Invention

The present invention relates to a data modem for a detecting and cancelling line deterioration factor and particularly to a line signal deterioration removing system to be employed for data modem which effectively removes phase jitter factor.

2. Description of the Related Art

Data transmission utilizing a telephone line having a transmission band in the voice frequency range is recently spreading. In such a data transmission system, a so-called modem usually providing a modulator in the sending side and a demodulator in the receiving side is provided and various line deterioration factors generated in the line between the modems are removed by such modems provided in the sending side and receiving side.

Particularly, since the recent modulation system has improved the data transmission rate through introduction of the multiphase modulation system, it is desirable to equalize, with high accuracy, various kinds of signal deteriorations in relation to the phases of the signals to be transmitted. Such signal deteriorations include intersymbol interferences effectuated on the line, frequency offset generated due to a difference of carrier frequencies for modulation and demodulation, and phase jitter generated due to a fluctuation of power source voltage.

When the telephone line in the frequency range of 0.3~3.4 kHz is used, it is known that following typical deterioration factors must be considered.

(1) Intersymbol interference
(2) Phase error and frequency offset
(3) Phase jitter For the equalization of characteristics which are considered as the deterioration factors, signal deterioration has been compensated in the receiving side with the structure shown in FIG. 11.

FIG. 11 is a structural diagram of an algorithm within the modem of receiving side of the prior art. Such structure is executed by programs using digital signal processing LSIs and microprocessors.

In the same figure, reference numeral 10 designates an automatic equalizer or (AEQ) 10 which is for example formed by a transversal filter. To an automatic equalizer 10, the base band signal after the demodulation or the pass band signal before demodulation which is received from the transmission line is input as the coordinate data (vector data) of signal points on the complex plane. The equalized output obtained by removing the intersymbol interference element which is the first deterioration factor 1 from such input signal is thus output.

In the successive stage of equalizer 10, a carrier phase controller 11 comprising a carrier automatic phase control circuit (or CAPC) 12 and a hard (or non-probabilistic) decision circuit 26 is provided. CAPC 12 foresees frequency offset and phase error included in the equalized output of equalizer (or automatic equalizer) 10 with the integral operation of quadratic form.

The output of CAPC 12 is multiplied, in vector form, with the equalized output of equalizer 10 and with the feedback signal to the equalizer 10 at the position where the conjugate vector * is indicated by the symbol at which denotes a multiplying point. The multiplication (second occurrence only) of the CAPC 12 output to the output of automatic equalizer 10 means stops phase rotation, i.e. demodulation and multiplicaiton, while the multiplication of the CAPC 12 output and the by feedback signal to the automatic equalizer 10 causes addition of phase rotation, i.e. modulation. The principle of removing carrier frequency offset with such structure is based on the principle that the phase of output of the automatic equalizer 10 rotates at a constant angular velocity due to the influence of carrier frequency offset. This rotation can be ceased by multiplying an output of CAPC 12 with the output of the equalizer 10.

As an input to the carrier automatic phase control circuit 12, a hard non-probabilistic decision error is given as a phase difference between the non-probabilistic decision point and receiving point by a non-probabilistic decision circuit 26. CAPC 12 computes frequency offset and phase error element included in the output of equalizer 10 based on such hard decision error. The computation result is multiplied with the equalizer 10 output. This structure is known as a non-probabilistic decision error feedback system because the non-probabilistic decision error is obtained from the output of the non-probabilistic decision circuit 26.

Following the carrier phase controller, a phase jitter remover 13 including a prediction filter circuit (or prediction filter) 14 is provided.

The prediction filter circuit 14 predicts a phase jitter element by using prediction filter 14. An output of prediction filter 14 is multiplied to an output value of the carrier phase controller 11 at the part of multiplication code in order to remove the phase jitter element from the output of the carrier phase controller 11.

Line deterioration factors such as intersymbol interference, frequency offset, phase error and phase jitter are error-corrected and the revmoed receiving point information is finally applied to a soft (probabilistic) decision circuit or non-probabilistic decision circuit 16. The probabilistic decision circuit 16 decides, based on the input value, the most likely signal point which the receiving signal takes by the well known viterbi decoding method.

Moreover, in the case of non-probabilistic decision, like the preceding non-probabilistic decision, the signal points assigned corresponding to the regions assigned to each complex space are decided using tables corresponding to the values of respective regions.

Decision error given as an error between the decision point of the probabilistic decision circuit or non-probabilistic decision circuit 16 is fed back to the prediction filter circuit 14 as a normalized output for optimization control of the prediction filter circuit 14. Moreover, this error is also fed back to the automatic equalizer 10 through two multipliers.

In such a prior art system, intersymbol interference which is a signal deterioration factor of a transmission line is removed by the automatic equalizer 10, while frequency offset and phase error are removed by the carrier phase controller 11 and phae jitter is removed by phase jitter remover 13.

However, when a transmission rate of the transmission line to transmit data with the phase modulated signal becomes higher, data of respective signals are different even when the phases are very approximated, and therefore very accurate demodulation of signal phase is required.

The conventional modem does not require highly accurate demodulation and compensation for phase because the transmission rate is low, but when it is applied to demodulation of relatively high transmission rates, the signal deterioration factors cannot be removed perfectly, resulting in a problem that phase error becomes numerous.

At relatively high transmission rates, attempts have been made to eliminate the necessity of raising accuracy of signal phase during the demodulation by automatically compensating for an error with convolutional encoding, i.e., maximum likelihood encoding method such as viterbi encoding or multi-dimensional trellis encoding, etc. However, this method cannot accurately realize the phase compensation of a receiving signal and is not always recommended as a method of compensation.

In addition, the conventional structure explained above is preferable in situations in which high trackability for distortion of phase error can be obtained by using a non-probabilistic decision circuit 26 which can suppress delay within the loop to zero for the control of CAPC 12 by feedback of non-probabilistic decision error. However, when the higher trackability is obtained, a problem arises in that noise bandwidth of CAPC 12 becomes wider and S/N characteristic is deteriorated.

Therefore, it is desirable that the trackability be lowered and S/N characteristic be improved. However, in this case, undesirable large share is applied on the prediction filter 14 in the successive stage.

Accordingly, the optimization of S/N characteristic has been attempted by searching the intermediate point.

Moreover, the inventors of the present invention have found that even when various coefficients are optimized with such structure, a phase includes an error and highly accurate compensation is impossible.

SUMMARY OF THE INVENTION

It is therefore an object of the present invention to provide a method and an apparatus for realizing highly accurate phase compensation with a structure to compensate for phase of receiving signal.

It is another object of the present invention to provide a line signal deterioration compensating apparatus comprising an automatic equalizer, namely a method and an apparatus for determining signals with high accuracy after removing phase jitter interference through preceding equalization by automatic equalizer.

It is other object of the present invention to provide a method and an apparatus for perfectly removing phase jitter.

It is further object of the present invention to provide a method and an apparatus for realizing high S/N characteristic by removing phase jitter and improving the frequency offset and phase error removing function.

It is still other object of the present invention to provide a data modem which may also be applied to the maximum likelihood encoding transmission system such as the viterbi encoding, multidimensional trellis encoding system, etc. and is capable of deciding data with high phase accuracy.

The inventors of the present invention have found as a result of analyses for the uncompensated element that in an automatic equalizer formed by a transversal type filter, each signal is shifted on tap from the past to the future in order to compensate for intersymbol interference and the phase jitter element included in the one of a plurality of receiving signals is partly uncompensated because such element has one influence on the output signal while it exists on on the taps.

Therefore, phase jitter can certainly be compensated by removing or suppressing influence on the phase jitter during compensation for intersymbol interference with predetermined removing circuit before removing phase jitter using a prediction filter.

Moreover, in the present invention, response time constant of a CAPC 12 is set to a large value in order to stabilize operations of the CAPC 12. Thereby, the trackability for phase jitter of lower frequency may be lowered. This phase jitter is removed by predicting it with the prediction filter. In this case, since the prediction filter is formed by a transversal type filter providing a limited number of taps for shifting signals, it shows remarkably low trackability for lower frequency. However, in the case of the present invention, a frequency shift means for multiplying predetermined frequency to the input signal of operation frequency of the prediction filter is provided in the preceding stage of the prediction filter. Thereby, the prediction filter can process the high frequency signal and has sufficient removing capability to lower frequency phase jitter.

BRIEF DESCRIPTION OF THE DRAWINGS

FIG. 3 is a diagram for explaining the allocating condition of the phase jitter interference cancelling function of the present invention.

FIG. 4 is a line model in the present invention.

DESCRIPTION OF THE PREFERRED EMBODIMENTS

Figure 1:
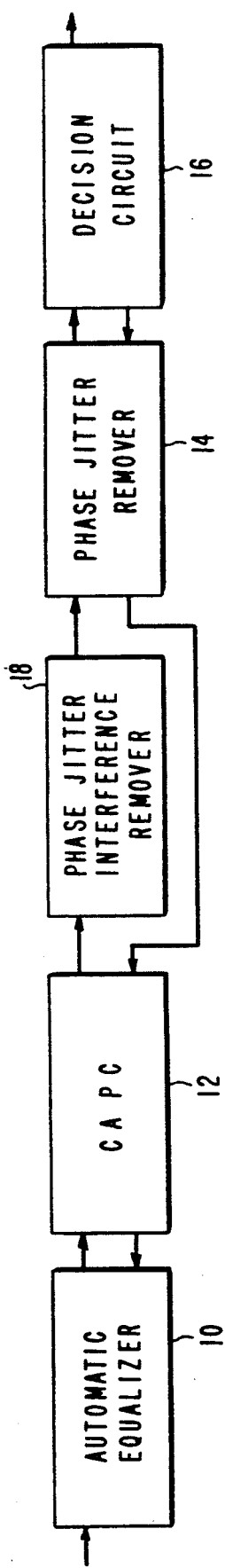
FIG. 1 is a diagram for explaining the principle of the present invention.

In FIG. 1, an automatic equalizing means (or automatic equalizer) 10 removes intersymbol interference element from the signal point information on the complex plane or pass band signal demodulated from the receiving signal of transmission line. A carrier automatic phase control means (or CAPC) 12 removes phase error and frequency offset element included in the equalized output of the automatic equalizing means (or AEQ) 10.

A phase jitter removing means 14 removes phase jitter element included in the output of the carrier automatic phase control means 12.

A deciding (or decision) means 16 decides a signal point on the most likelihood complex plane, in the case of probabilistic decisions, utilizing redundancy added in the sending side, based on an output of the phase jitter removing means 14, moreover decides in direct in the case of the non-probabilistic decision and generates an error between the ideal receiving point and the actual receiving point.

In the first embodiment of the present invention, a phase jitter interference removing means 18 is additionally disposed in the successive stage of the automatic equalizing means 10 and CAPC 12.

In the second embodiment, a modulating means and a demodulating means are provided before and after a phase jitter prediction filter to be provided to the phase jitter removing means 14 and moreover a modulating means is provided for the feedback signal to the prediction filter.

A phase jitter interference removing means 18 receives phase jitter influenced by compensation for intersymbol interference and frequency offset in the automatic equalizing means 10 and CAPC 12.

The phase jitter interference removing means 18 filters such receiving signals with a filter having the characteristic approximated to the line characteristic such as a fixed filter and amplifies and extracts only the transmitting signal and phase jitter as the outputs.

An output of the phase jitter interference removing means 18 is supplied to the phase jitter removing means 14. This phase jitter removing means 14 removes the amplified phase jitter and phase jitter element from the combined signal of transmitting signals and then supplies the phase jitter free signal to the deciding means 16.

In the second embodiment, the phase jitter removing means 14 is capable of processing a low frequency phase jitter at a higher frequency since it can raise the input signal frequency up to the determined frequency, namely, is capable of improving S/N characteristic because phase jitter becomes a signal to be processed easily on the frequency axis.

Figure 2:
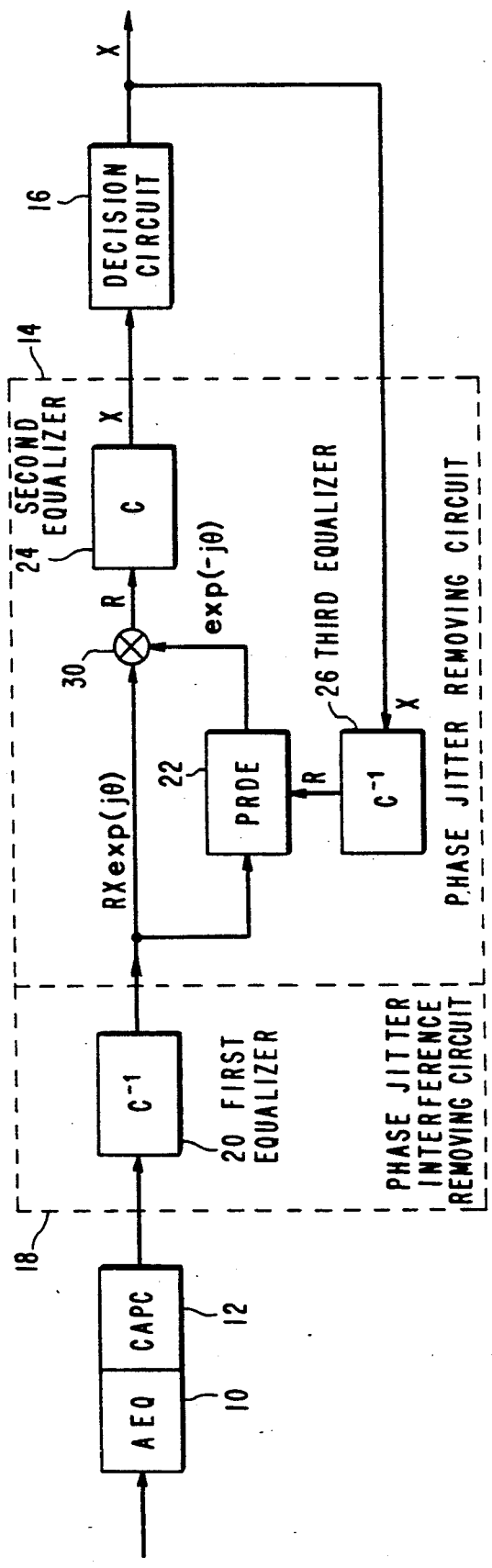
FIG. 2 is a structure indicating the principle of a preferred embodiment of the present invention.

FIG. 2 is a structural diagram of the first embodiment of the present invention.

In FIG. 2, reference numeral 10 designates an automatic equalizer (AEQ), which conducts equalized compensation for removing intersymbol interference included in the receiving point coordinates data obtained by demodulating signal points on the complex plane from the receiving signal of the transmission line (telephone line).

Reference numeral 12 designates a carrier automatic phase control circuit (CAPC), which removes phase error and frequency offset which are line deterioration factors included in an output of the automatic equalizer 10. Following the carrier automatic phase control circuit 12, a phase jitter interference removing circuit 18 is newly provided in the present invention and this phase jitter interference removing circuit 18 is realized by a first fixed equalizer (or first equalizer) 20 which provides a phase-jitter-interference-conditioned signal. Details of such phase jitter interference removing circuit (or PRDE) 18 will be made apparent later.

Following the phase jitter interference removing circuit 18, a phase jitter removing circuit 14 is disposed and this phase jitter removing circuit 14 is provided with a phase jitter prediction circuit 22 and second and third fixed equalizers (or "second equalizer" and "third equalizer", respectively) 24, 26. These circuits will be explained in detail later.

Following the phase jitter removing circuit 14, a decision circuit 16 is provided. This decision circuit 16 decides and outputs the most likely signal point corresponding to the receiving signal point by the maximum likelihood decoding, namely the viterbi decoding corresponding to addition of one redundant bit due to the trellis encoding conducted for error control in the transmitting side. Moreover, a decision error output (probabilistic decision error output) of decision circuit 16 is fed back as a normalized output in order to optimize the phase jitter prediction circuit 22 of the phase jitter removing circuit 14. Here, the reason why the phase jitter interference removing circuit (or phase jitter removing means) 18 is provided after the carrier automatic phase control circuit 12 and before the phase jitter removing circuit 14 as shown in the embodiment of FIG. 2, which is newly done in the present invention will be explained.

FIG. 3 indicates correspondence of cancelling function in the receiving side for each of the intersymbol interference, phase error/frequency offset, phase jitter interfence and phase jitter as the major deterioration factors in the transmission line and moreover indicates, in the right side, the necessity for suggesting that the other deterioration factors are already cancelled or not before cancelling a certain deterioration factor.

As will be obvious from FIG. 3, it is desirable for the phase jitter interference cancel function newly provided by the present invention to precedingly cancel intersymbol interference and phase error/frequency offset and phase jitter, and if it is not cancelled, it does not result in any problem on the contrary. Meanwhile, it is desirable, preceding the operation of the phase jitter removing circuit which cancels phase jitter, to cancel intersymbol interference, phase error/frequency offset and phase jitter interference.

Accordingly, the phase jitter interference removing circuit 18 of the present invention is provided at the position after the carrier automatic phase control circuit 12 and before the phase jitter removing circuit 14 as shown in FIG. 2, and thereby phase jitter interference element can be removed by giving an output from which intersymbol interference is removed with the automatic equalizer 10 and phase error and frequency offset with the carrier automatic phase control circuit 12 to the phase jitter interference removing circuit 18.

Next, the factors of generating phase jitter interference to be removed by the embodiment of FIG. 2 are discussed as follows.

Phase jitter interference to be removed by the present invention depends on characteristics of transmission line after the factor inserting point of the phase jitter. Therefore, a line model shown in FIG. 4 is considered as the transmission line for removing phase jitter interference of FIG. 2.

The requirements for determining line model shown in FIG. 4 are as follows. An inserting point 28 of phase jitter exp(jθ) is selected to only one point.

Since the transmission line is usually formed as the multi-link structure, phase jitter is inserted from a plurality of points, but the phase jitter inserting point for greater deterioration for simplification of model is considered only as the one point. In this model, the inserting point 28 of phase jitter exp(jθ) should be considered for insertion in both sides of transmitting and receiving sides. Namely, insertion in both sides must be covered considering actual situation and characteristic evaluation of real transmission line. The line characteristic where phase jitter exp(jθ) does not exist should be flat. Namely, it is defined that product of line characteristic D and line characteristic C, D C=1.

A typical line model as shown in FIG. 4 can be obtained, considering the requirements for determining such line model.

In FIG. 4, X indicates a transmitting signal, which becomes R signal by influence of line characteristic D and then becomes K signal by influence of phase jitter $\exp(j\theta)$ at the phase jitter inserting point 28 and then becomes equalized output signal Y by influence of line characteristic C.

Next, the phase jitter interference element to be removed by the present invention of the model shown in FIG. 4 is explained as follows.

First, the transmitting signal X changes to the R signal with influence of deterioration factor by line characteristic D and this R signal is expressed as follows.

$$R = X \cdot D \quad (1)$$

Thereafter, this signal changes to the K signal due to influence of deterioration factor by phase jitter $\exp(j\theta)$ at the phase jitter inserting point 28. This K signal is expressed as follows.

$$K = R \times \exp(j\theta) \quad (2)$$

Moreover, the K signal changes to Y signal due to influence of deterioration factor by line characteristic C. The Y signal is expressed as follows.

$$Y = K \cdot C = R \times \exp(j\theta) \cdot C = \text{equalized output} \quad (3)$$

Therefore, since D C=1 from the condition (3), the formula (3) may be developed as follows.

$$\begin{aligned} Y &= R \times \exp(j\theta) \cdot C \\ &= R \cdot C + R \times \exp(j\theta) \cdot C - R \cdot C \\ &= X \cdot D \cdot C + R\{\exp(j\theta) - 1\} \cdot C \\ &= X + R\{\exp(j\theta) - 1\} \cdot C \end{aligned} \quad (4)$$

$R\{\exp(j\theta)-1\}C$ in the last term of the formula (4) indicates (phase jitter)+(phase jitter interference element) and coupled deterioration factors of phase jitter and phase jitter interference which always exist in the line where phase jitter exists.

Accordingly, the phase jitter interference is cancelled on the basis of the result of computation for phase jitter interference element indicated by the last term of the formula (4).

A structure of embodiment of the present invention shown in FIG. 2 based on investigation on phase jitter interference proposed for line model of FIG. 4 will be explained in detail.

In FIG. 2, as an input of the phase jitter interference removing circuit 18, the outputs having eliminated intersymbol interference and phase frequency offset of the automatic equalizer 10 and carrier automatic phase control circuit 12 are used and this output signal includes only the (phase jitter)+(phase jitter interference element) indicated by the second term in the right side of the formula (4).

The phase jitter interference removing circuit 18 comprises a first equalizer 20 which has set the line equalizing characteristic $C^{-1}$ for the line characteristic C of the phase jitter inserting point 28 and successive points shown in FIG. 4 to eliminate phase jitter interference element by effectuating equalizing compensation by the line equalizing characteristic $C^{-1}$ to the output of carrier automatic phase control circuit 12. Namely, since an output of the carrier automatic phase control circuit 12 is expressed as $$X + R\{\exp(j\theta) - 1\}C,$$

$R \times \exp(j\theta)$ including only the phase jitter element having removed phase jitter interference element can be obtained by conducting equalized compensation based on the line equalizing characteristic $C^{-1}$ to such output. Elimination of phase jitter interference element by the first equalier 20 also newly generates intersymbol interference but such intersymbol interference newly generated by the first equalizer 20 may be cancelled, if necessary, by additionally providing an equalizer to the preceding stage of the decision circuit 16.

Next, an output having removed phase jitter interference element in the first equalizer 20 is then applied to the phase jitter prediction circuit 22 provided in the phase jitter removing circuit 14 in the next stage and thereby phase jitter element $\exp(-j\theta)$ is computed. The output $\exp(-j\theta)$ of phase jitter prediction circuit 22 is applied to the multiplying point 30 to obtain R by removing phase jitter $\exp(j\theta)$ from the output of first equalizer 20. Following the multiplying point 30, a second equalizer 24 is provided due to provision of the first equalizer 20 for removing phase jitter interference to provide a phase-jitter-interference-conditioned signal. The line characteristic C, which is the inverse characteristic of the line characteristic $C^{-1}$ of the first equalizer 20, is set to the second equalizer 24 and thereby the equalized output X can be obtained by executing equalized compensation by the equalization characteristic C to the output R from the multiplying point 30.

The output X from the phase jitter removing circuit 14 thus obtained is sent to the decision circuit 16 to decide the most likely signal point by the viterbi decoding and output such deciding point as the final receiving point. Thereby, such receiving point is converted, as is well known, to the bit train corresponding to the coordinates position on the complex plane of the deciding point using a bit map circuit (not illustrated).

Moreover, probabilistic decision error from the decision circuit 16 is fed back, after normalization, to the phase jitter prediction circuit 22 provided to the phase jitter removing circuit 14 and the normalized output of decision circuit 16 receives equalized compensation by a third equalizer 26 provided in the feedback loop. Namely, the line equalizing characteristic C which is the same as that of the first equalizer 20 for removing phase jitter interference is set to the third equalizer 26 and the phase jitter prediction circuit 22 can be optimized by obtaining the output R by conducting equalized compensation based on the line equalizing characteristic $C^{-1}$ to the normalized output from the decision circuit 16 and then feeding back such output R to the phase jitter prediction circuit 22.

When the line equalizing characteristics $C^{-1}$, C of the equalizers are set as the active characteristics in the first equalizer 20, second equalizer 24 and third equalizer 26 shown in FIG. 2, the line where phase jitter does not exist has infinitive coefficient solutions and becomes difficult to be stabilized. Therefore, as shown in FIG. 5, a transversal type fixed equalizer is used as the first, second and third equalizers 20, 24, 26 and fixed constants are set, from the experimental viewpoint, as the counting numbers $C1 \sim Cn$ of the fixed equalizers.

Figure 5:
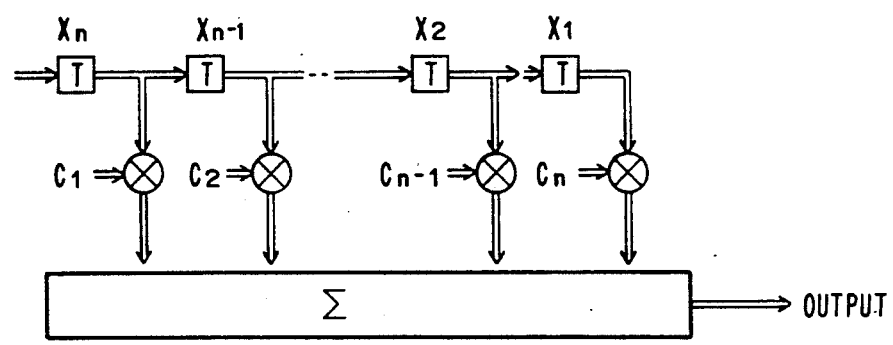
FIG. 5 is a structural diagram of an embodiment of a fixed equalizer to be used in the present invention.
Figure 6:
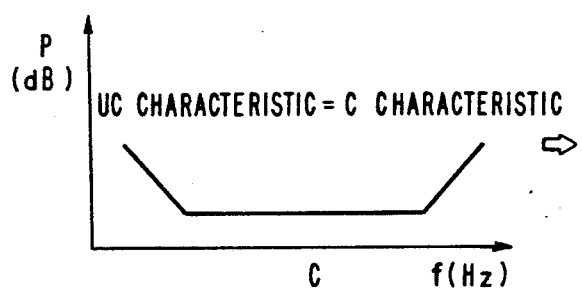
FIG. 6 and FIG. 7 are diagrams for explaining unconditioned line characteristic and equalizing characteristic.

Since the counting numbers C1~Cn of the fixed counters shown in FIG. 5 have the unconditioned characteristics shown in FIG. 6 as the typical line characteristics, this unconditioned characteristic of FIG. 6 is considered as the line characteristics $C^{-1}$ of the phase jitter inserting point 28 and the successive points shown in FIG. 4.

Figure 7:
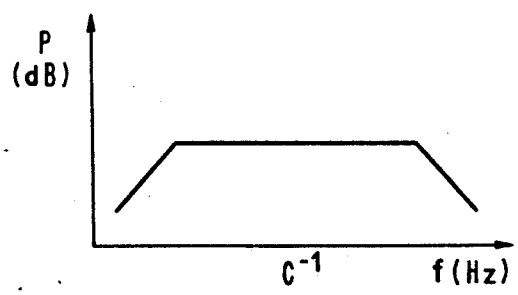

In the embodiment of FIG. 2 for the unconditioned characteristic of FIG. 6, the coefficients C1~Cn of the transversal type fixed equalizers shown in FIG. 5 are set to the first equalizer 20 and third equalizer 26 so that the inverse characteristic $C^{-1}$ of the unconditioned characteristic of FIG. 6 shown in FIG. 7 can be obtained, and meanwhile the coefficients C1~Cn of the fixed equalizers of FIG. 5 are set for the second equalizer 24 of FIG. 2 so that the unconditioned characteristic of FIG. 6 can be obtained.

The line equalizing characteristics $C^{-1}$, C to be set to the equalizer 20, 24, 26 of FIG. 2 are not limited only to the unconditioned characteristic and the equalizing characteristic based on the other adequate typical line characteristics can certainly be set.

Figure 8:
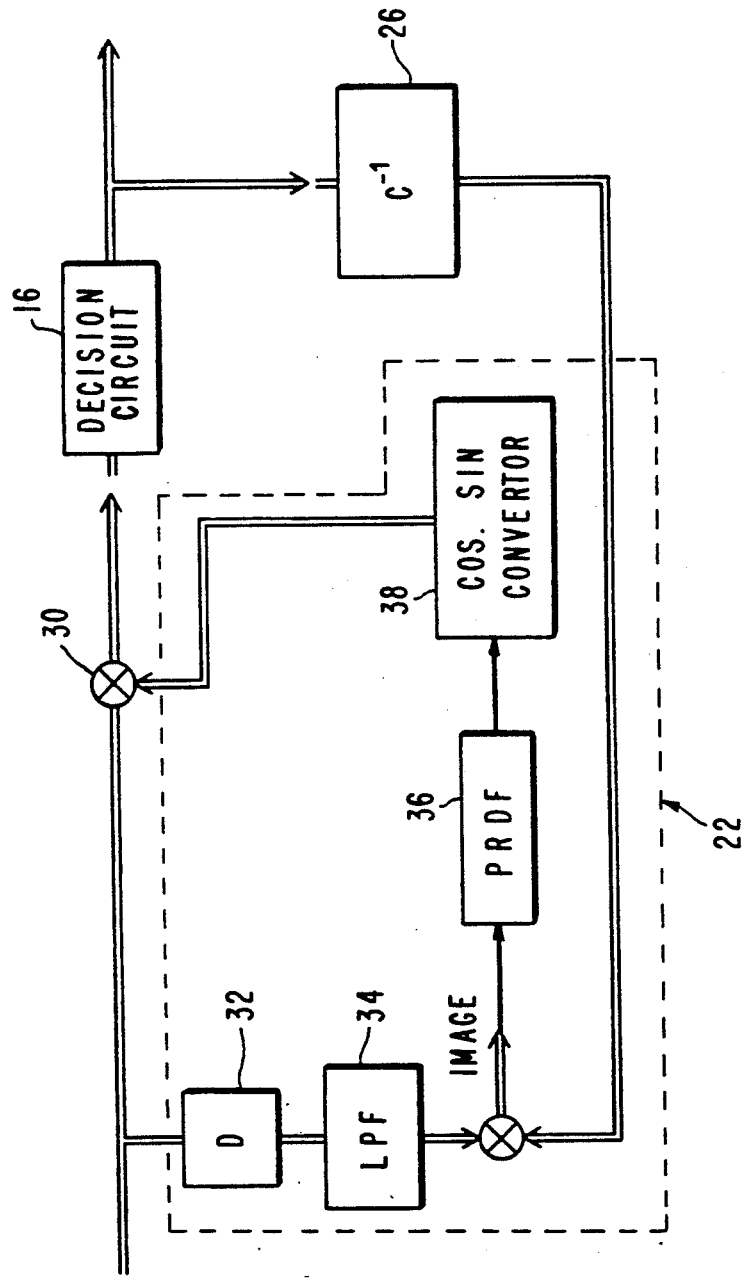
FIG. 8 is a structural diagram of an embodiment of the phase jitter prediction circuit of the present invention.

FIG. 8 indicates a practical structure of the embodiment of the phase jitter prediction circuit 22 provided in the phase jitter removing circuit 14 shown in FIG. 2.

In FIG. 8, the phase jitter prediction circuit 22 multiplies an output from the first equalizer 20 shown in FIG. 2 with the normalized output which is equalized and compensated by the third equalizer 26 through a delay circuit (or D) 32 and a low-pass filter (or LPF) 34 and thereafter inputs the output to the prediction filter (or PRDF) 36 through conversion into a scalar value in order to predict the phase jitter element and then converts again an output of prediction filter 36 to vector data with a cos/sin converter 38 and multiplies it at the multiplying point 30 to remove phase jitter element.

A delay circuit 32 shown in FIG. 8 is necessary for the decision circuit 16 to conduct probabilistic decision through the viterbi decoding but is unnecessary for non-probabilistic decision in the decision circuit 16, namely for deciding the nearest signal point on the complex plane for the demodulation receiving point without using transition rule by the trellis encoding in the transmitting side.

Figure 9:
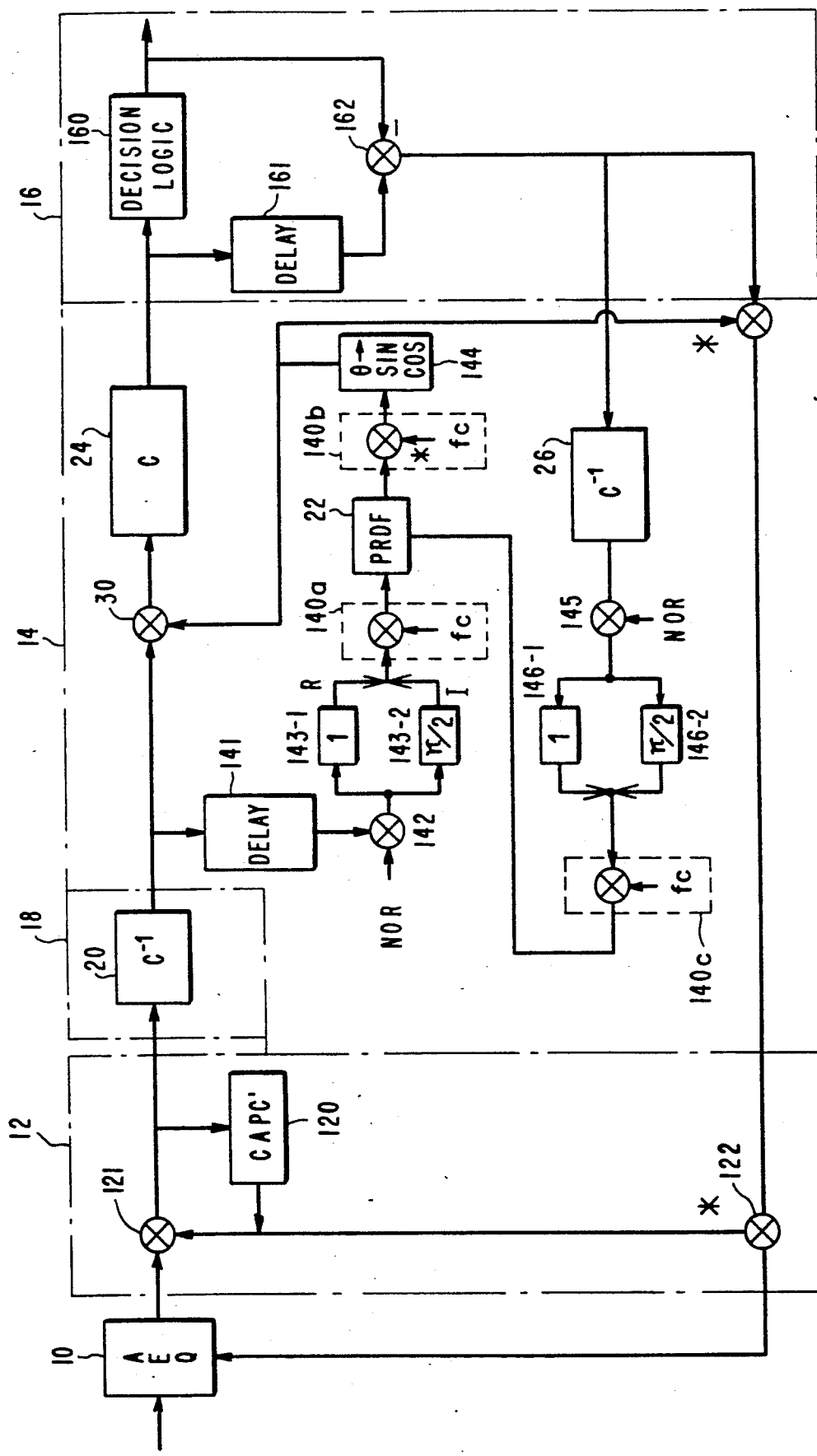
FIG. 9 is an entire structural diagram of an embodiment of the present invention.

FIG. 9 is a structural diagram of the entire part of the second embodiment of the present invention.

In FIG. 9, reference numeral 10 designates automatic equalizer (AEQ) which receives coordinate data at the receiving point demodulated from the receiving signal of the transmission line, namely the receiving point vector data or pass band signal as the input and provides equalized output which is equalized and compensated for intersymbol interference element as the line deterioration factor included in such input vector data.

Following the automatic equalizer 10, a carrier phase controller (or "carrier automatic phase control circuit") 12 is provided. In the carrier phase controller 12, a carrier automatic phase control circuit 120 is provided. This carrier automatic phase control circuit 120 computes frequency offset and phase error element included in the equalized output of automatic equalizer 10 to remove these elements from the equalized output by applying these elements to a multiplying circuit 121. This carrier phase controller 12 is already disclosed by the drawings for example, of the Japanese Published patent application No. 55-33203 or U.S. Pat. No. 4,097,807. Moreover, the carrier automatic phase control circuit 120 is known as the secondary CAPC circuit because it is provided following the automatic equalizer 10.

Following the carrier phase controller 12, the phase jitter interference remover 18 described previously is provided to remove and suppress the elements other than the true phase jitter element in the line among phase jitter element which is not removed perfectly in the carrier phase controller 12. Next to the phase jitter interference remover 18, the phase jitter removing means 14 is provided. The phase jitter removing means 14 removes phase jitter element from an output, in which phase jitter element is amplified, of the phase jitter interference remover 18.

Following the phase jitter remover 14, a decision circuit 16 is provided. The decision circuit 16 is provided with a probabilistic decision circuit or non-probabilistic decision circuit (or decision logic) 160, which decides, in the case of probabilistic decision, the signal point on the most likely complex plane and corrects error of the receiving signal point by utilizing a degree of redundancy added in the transmitting side. Namely, since one redundant bit is added for controlling errors with the trellis/encoding circuit provided in the data modem in the transmitting side, the most likely signal point is decided by the viterbi decoding utilizing the one redundant bit added by the trellis encoding. On the other hand, in the case of non-probabilistic decision, decision is made in direct by utilizing a table.

The receiving decision point by the probabilistic decision circuit or non-probabilistic decision circuit 160 is given to a coordinates/bit train converting circuit (not illustrated) provided in the successive stage and is then converted to the bit train corresponding to the signal points.

Moreover, the decided output of the probabilistic decision circuit or non-probabilistic decision circuit 160 is applied to an adder 162 and an input to the probabilistic decision circuit or non-probabilistic decision circuit 160 is applied through a delay circuit 161 to the other input of adder 162 in order to extract a difference between the decision point and the receiving point obtained through the delay circuit 161, namely probabilistic decision or non-probabilistic decision error in the adder 162.

The probabilistic decision or non-probabilistic decision error obtained from the adder 162 is fed back to the phase jitter remover 14 and is then used for optimization of prediction filter which may be explained obviously later.

For improvement of S/N characteristic, it is necessary to narrow the noise bandwidth of carrier automatic phase control circuit 12 and time constants of carrier automatic phase control circuit 12 are set larger for this purpose. For instance, a degree of feedback to the multiplier 121 in the CAPC 120 of FIG. 9 is set to smaller value. As a result, the trackability for low speed jitter (low frequency jitter) by the carrier automatic phase control circuit 120 is lowered and the carrier phase controller 12 can no longer sufficiently remove low frequency jitter.

Therefore, the low frequency jitter which is not sufficiently removed by the carrier phase controller 12 is then removed by the phase jitter remover 14 in the next and successive stages but the prediction filter 22 provided in the phase jitter remover 14 has very weak trackability for low frequency because a number of taps is finite. Accordingly, even when the prediction filter 22 of phase jitter remover 14 is operated in direct, it cannot follow low frequency jitter and therefore cannot remove phase jitter sufficiently.

Therefore, the present invention realizes tracking to low frequency jitter by shifting operation frequency range of the prediction filter 22 provided in the phase jitter remover 14 to the higher frequency region.

The phase jitter remover 14 is explained in detail as follows.

First, the receiving point data, namely receiving point vector data from which the intersymbol interference, frequency offset and phase error are removed by the automatic equalizer 10 and carrier phase controller 12 is taken through the delay circuit (or delay) 141 and is multiplied with NOR (normalized signal) in the multiplier 142. Thereafter, only the imaginary element is extracted and the vector elements, namely the coordinate value R of real number axis and the coordinate value I of imaginary number axis on the complex plane based on the input vector data are generated by the Hilbert filters 143-1, 143-2. The vector elements R, I generated by the Hilbert filters 143-1, 143-2 are input to the prediction filter 22, after it is frequency-modulated by frequency fc in the modulation circuit 140a, namely the frequency is shifted to the right by +fc. In the prediction filter 22, the vector elements R, I indicating computed phase jitter elements are applied to the demodulation circuit 140b provided in the output stage, returned to the original frequency through demodulation by frequency fc in the demodulation circuit 24, then applied to the multiplier 30 through conversion again to the vector data by the 0−sin 0, cos 0 conversion circuit 144. In the multiplier 30, phase jitter element included in the output given through the carrier phase controller 12 and phase jitter interference remover 18 is removed.

In addition, the probabilistic deicision or non-probabilistic decision error from the adder 162 provided in the decision part (or decision circuit) 16 is normalized by NOR (normalized data) of multiplier 145 given to the third equalizer 26 explained previously and thereafter converted to the vector elements R, I by the Hilbert filters 146-1, 146-2. This error signal as the normalized vector element is applied to the modulation circuit 140c and is frequency-modulated by the frequency fc as in the case of modulation circuit 140a and thereafter applied as the error signal for optimizing the prediction filter 22.

The operation frequency region of prediction filter 22 is changed, by the modulation circuits 140a, 140c and demodulation circuit 140b provided in the input/output ends of prediction filter 22, to the higher frequency operation region in which the frequency is shifted as much as the modulation frequency fc and such frequency shift of operation region causes the prediction filters 14-1, 14-2 which provides weak tracking to lower frequency to follow sufficiently lower frequency jitter. Moreover, low frequency jitter which has not yet been removed by the carrier phase controller 12 is also predicted accurately by the prediction filter 22 provided in the phase jitter remover 14 and can be removed by the multiplier 30.

The automatic equalizer 10, carrier phase controller 12, phase jitter inteference remover 18, phase jitter remover 14 and decision part 16 shown in FIG. 9 are realized by a digital signal processor (DSP).

Figure 10:
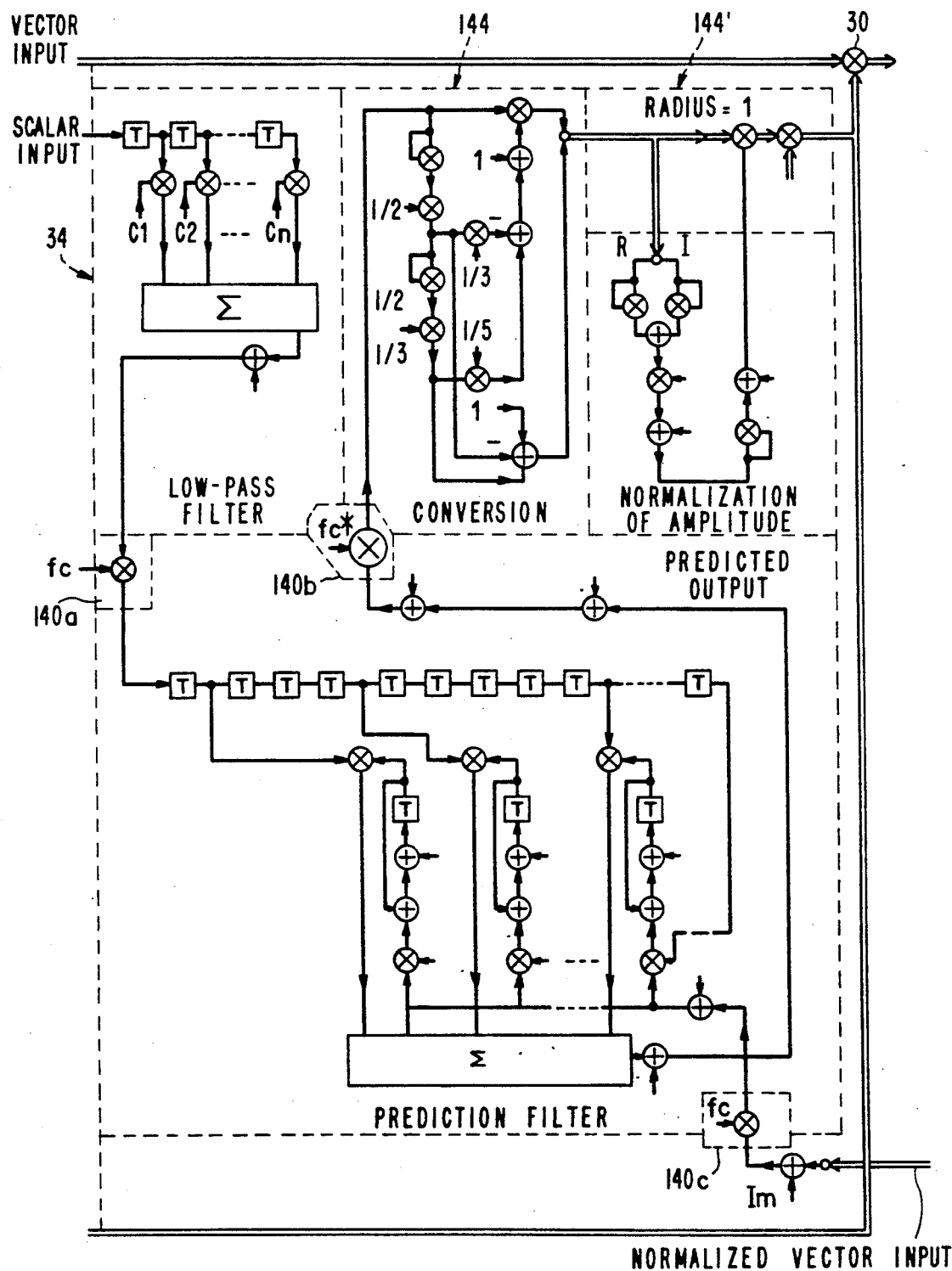
FIG. 10 is an algorithm diagram of detailed embodiment of the essential portion of the present invention realized with a digital signal processor.
Figure 11:
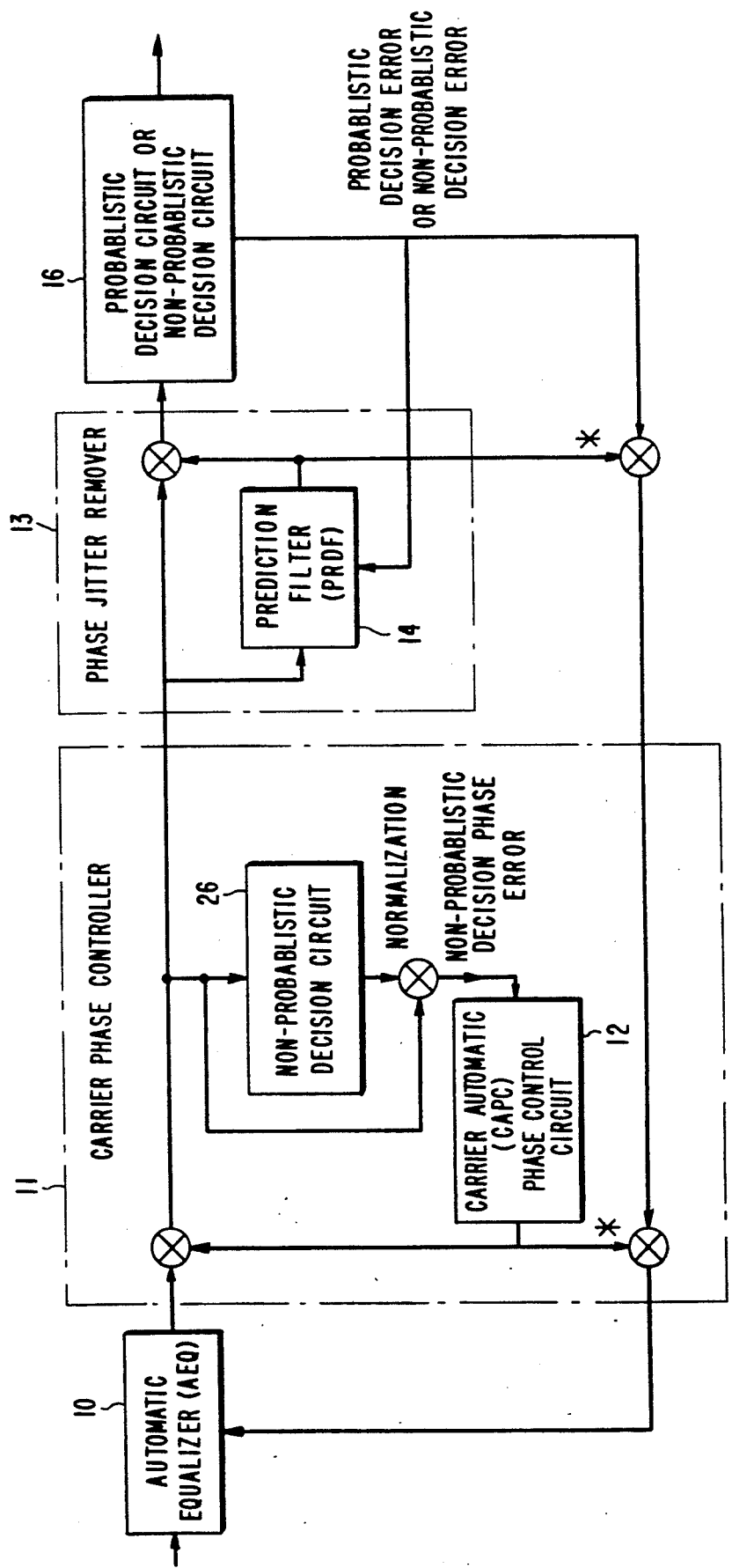
FIG. 11 is a block diagram of a receiving side of a prior art modem.

FIG. 10 is a structural diagram of an embodiment indicating the algorithmn realized by the digital signal processor (DSP) of the phase jitter prediction circuit 22 provided in the phase jitter removing circuit 14 of FIG. 9. In this figure, T indicates a tap register; x , multiplication; ⊕, addition and Σ, summing(totalization). The arrow mark without any coefficient code is given a constant value.

In FIG. 10, a vector input and a scalar input are given to the phase jitter prediction circuit 22. The scalar input is given to the prediction filter 22 through a low-pass filter 34. The normalized vector input is applied, after equalized compensation depending on the line equalizing characteristic $C^{-1}$, to the prediction filter 22. A predicted signal of the prediction filter 22 is frequency-shifted by the demodulating computation 140b, then converted into a vector data by the cos/sin converting circuit 144, normalized in the amplitude in the amplitude normalizing circuit 144' and is then input to the multiplying point 30 to cancel phase jitter element included in the vector input.

As explained previously, the present invention is capable of almost removing deterioration factors of line by removing phase jitter interference generated in the transmission line after the phase jitter factor inserting point and realizing high quality data transmission for super-high speed modem by improving S/N error rate and also extending the application range.

Moreover, according to the present invention, even if low frequency jitter is not perfectly removed by making the time constants of the carrier automatic phase control circuit larger for improving S/N characteristic, the prediction filter which is so far inferior in tracking to lower frequency can sufficiently follow low frequency jitter by operating with the phase jitter remover utilizing the prediction filter located in the next stage through shifting of the frequency operation region of prediction filter. Low frequency jitter left through the carrier phase control by feedback of probabilistic decision or non-probabilistic decision error can also be suppressed and removed by effectively utilizing the prediction filter.

What is claimed is:

1. A line signal deterioration removing system supplied with a receiving signal on a transmission line, comprising:

an automatic equalizer for removing intersymbol interference from the receiving signal on the transmission line to provide an equalized signal;

phase jitter interference removing means, operatively coupled to said automatic equalizer, for receiving the equalized signal, for compensating for phase jitter interference in the equalized signal between at least two phase jitters generated when said phase jitter is supplied to said automatic equalizer, and for providing a phase-jitter-interference-conditioned signal;

phase jitter removing means, operatively coupled to said phase jitter interference removing means, for receiving the phase-jitter-interference-conditioned signal and for removing phase jitter included in the phase-jitter-interference-conditioned signal to provide a phase-jitter-conditioned signal; and deciding means, operatively coupled to said phase jitter removing means, for receiving the phase jitter-conditioned signal, for compensating for the intersymbol interference and the phase jitter from the phase-jitter-conditioned signal and for deciding a maximum likelihood signal point based on the phase-jitter-conditioned signal.

2. A line signal deterioration removing system according to claim 1, wherein said phase jitter interference removing means comprises carrier automatic phase control means for generating an output, and a first equalizer operatively coupled to said carrier automatic phase control means and having a first line characteristic for a phase jitter inserting point and for a plurality of successive points on the transmission line, which removes the phase jitter interference included in the output of said carrier automatic phase control means to generate the phase-jitter-interference-conditioned signal.

3. A line signal deterioration removing system according to claim 2, wherein said phase jitter removing means comprises a second equalizer coupled to said first equalizer and having a second line characteristic which is inverse to the first line characteristic of said first equalizer, which outputs a phase-jitter-conditioned signal having the phase jitter removed, and which supplies the phase-jitter-conditioned signal to said decision means after equalizing and compensating for the phase jitter by using said second equalizer.

4. A line signal deterioration removing system according to claim 3, wherein said phase jitter removing means further comprises:

a third equalizer operatively coupled to said deciding means and having a third line equalizing characteristic identical to the first line characteristic of said first equalizer, which conducts equalized compensation using a normalized output of said decision means which is fed back to said phase jitter removing means for optimization.

5. A line signal deterioration removing system according to claim 2, wherein said first equalizer includes a transversal filter type fixed equalizer.

6. A line signal deterioration removing system according to claim 1, wherein said line signal deterioration removing system includes a stage preceding said decision means, and wherein equalizing means for removing intersymbol interference generated during a removal of phase jitter by said phase jitter interference removing means is additionally provided in the stage preceding said decision means.

7. A line signal deterioration removing system in a data modem, said line signal deterioration removing system being supplied with a receiving signal on a transmission line, comprising:

automatic equalizing means for removing intersymbol interference from signal point information on a complex plane of the receiving signal on the transmission line to generate an equalized output;

carrier automatic phase control means for removing a phase error and a frequency offset included in the equalized output of said automatic equalizing means to generate a first output;

prediction filter means for removing phase jitter included in the first output of said carrier automatic phase control means to generate a second output;

decision means for deciding a plurality of signal points transmitted in a transmitting side of said line signal deterioration removing system based on the second output of said prediction filter means; and means for outputting a decision error corresponding to a difference between a decided signal point and a receiving signal point, wherein said prediction filter means comprises first modulation means for modulating a receiving point input responsive to the first output with a predetermined frequency after delaying the receiving point input for a required number of symbols for normalization;

second modulation means for modulating said decision error with said predetermined frequency after normalization; and demodulation means for recovering the second output by demodulation of the second output with said predetermined frequency;

a frequency operation region of said prediction filter means being shifted as much as the predetermined frequency.

8. A line signal deterioration removing system according to claim 3, wherein said second equalizer includes a transversal filter type fixed equalizer.

9. A line signal deterioration removing system according to claim 4, wherein said third equalizer includes a transversal filter type fixed equalizer.

10. An apparatus supplied with a signal, comprising:

an equalizer which reduces intersymbol interference in the signal to generate an equalized output;

a carrier automatic phase controller coupled to said equalizer, which receives the equalized output and which generates a first output by reducing at least one of a phase error and a frequency offset included in the equalized output, based on the equalized output;

a phase jitter interference remover coupled to said carrier automatic phase controller, which reduces a phase jitter interference included in the first output to generate a second output;

a phase jitter remover coupled to said phase jitter interference remover, which reduces a phase jitter included in the second output to generate a third output; and a decision unit coupled to said phase jitter remover, which receives the third output and which generates a plurality of signal points based on the third output.

11. A method for conditioning a signal, comprising the steps of:

a) reducing intersymbol interference in the signal to generate a first signal; b) reducing at least one of a phase error and a frequency offset in the first signal to generate a second signal;

c) reducing a phase jitter interference in the second signal to generate a third signal;

d) reducing a phase jitter in the third signal to generate a fourth signal; and e) generating a plurality of signal points based on the fourth signal.

* * * * *

UNITED STATES PATENT AND TRADEMARK OFFICE
CERTIFICATE OF CORRECTION

PATENT NO. : 5,189,684
DATED : February 23, 1993
INVENTOR(S) : Takashi KAKU et al.

It is certified that error appears in the above-identified patent and that said Letters Patent is hereby corrected as shown below:

Column 1, line 67, change "at" to -- ⊗ --.

Column 2, line 1, delete "(second occurrence only)";

Column 2, line 2, delete "means";

Column 2, line 3, delete "by";

Column 2, line 37, change "error-corrected and the revmoed" to --removed and the error-corrected--;

Column 2, line 61, change "phae" to --phase--;

Column 2, line 66, delete "very".

UNITED STATES PATENT AND TRADEMARK OFFICE
CERTIFICATE OF CORRECTION

PATENT NO. : 5,189,684
DATED : February 23, 1993
INVENTOR(S) : Takashi KAKU et al.

It is certified that error appears in the above-identified patent and that said Letters Patent is hereby corrected as shown below:

Column 4, line 66, change "likelihood" to --likely--.

Column 5, line 58, delete "(or PRDE)";

Column 5, line 62, after "circuit" insert --(or "PRDE")--.

Column 12, line 2, change "x" to -- ⊗ --.

Signed and Sealed this

Fourth Day of January, 1994

*Attest:*

BRUCE LEHMAN

*Attesting Officer*   Commissioner of Patents and Trademarks